United States Patent
Cormier et al.

(10) Patent No.: US 10,369,739 B2
(45) Date of Patent: *Aug. 6, 2019

(54) SURFACE UNDERLAYMENT SYSTEM WITH INTERLOCKING RESILIENT ASSEMBLIES OF SHOCK TILES

(71) Applicant: VICONIC SPORTING LLC, Dearborn, MI (US)

(72) Inventors: Joel M. Cormier, Lathrup Village, MI (US); Donald S. Smith, Commerce, MI (US); Richard F. Audi, Dearborn, MI (US); Dane R. Winbigler, Harper Woods, MI (US)

(73) Assignee: VICONIC SPORTING LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,304

(22) Filed: Dec. 22, 2016

(65) Prior Publication Data
US 2017/0101789 A1    Apr. 13, 2017

Related U.S. Application Data

(63) Continuation-in-part of application No. 15/006,458, filed on Jan. 26, 2016, now Pat. No. 9,528,280, which
(Continued)

(51) Int. Cl.
*B29C 51/00* (2006.01)
*E04F 15/02* (2006.01)
(Continued)

(52) U.S. Cl.
CPC ............ *B29C 51/002* (2013.01); *E01C 3/006* (2013.01); *E01C 13/02* (2013.01); *E01C 13/045* (2013.01);
(Continued)

(58) Field of Classification Search
CPC ..... B29C 51/002; B29C 51/00; E01C 13/045; E01C 13/02; E01C 2201/10; E04F 15/22;
(Continued)

(56) References Cited

U.S. PATENT DOCUMENTS 1,995,728 A  *  3/1935  Wood ................... A47B 63/02
                                                        312/330.1
2,275,575 A  *  3/1942  Vrooman ........... A47G 27/0412
                                                        428/167
(Continued)

FOREIGN PATENT DOCUMENTS

EP         1422344        11/2002
EP         2154291 A1     2/2010
(Continued)

OTHER PUBLICATIONS

International Search Report and Written Opinion; International application No. PCT/US2014/031333; dated Jul. 24, 2014.
(Continued)

*Primary Examiner* — Jeanette E Chapman
(74) *Attorney, Agent, or Firm* — Brooks Kushman P.C.

(57) ABSTRACT

A surface underlayment system and its method of manufacture that is sandwiched between an impact-receiving upper surface and a lower foundation. The energy absorbing system has subassemblies of interconnected modules that cooperate to absorb and distribute impact forces applied thereto. Each module has one or more frustoconical support structures. At least some of the frustoconical support structures have bases that underlie the upper impact-receiving surface such as a golf putting green, a football field, marine decking, and senior living flooring.

16 Claims, 13 Drawing Sheets

Related U.S. Application Data is a continuation-in-part of application No. 14/533,438, filed on Nov. 5, 2014, now Pat. No. 9,394,702, and a continuation-in-part of application No. 13/865,483, filed on Apr. 18, 2013, now Pat. No. 9,194,136.

(51) Int. Cl.

| | | |
|---|---|---|
| E01C 13/02 | (2006.01) | |
| E01C 13/04 | (2006.01) | |
| E04F 15/22 | (2006.01) | |
| E01C 3/00 | (2006.01) | |
| B29K 23/00 | (2006.01) | |
| B29K 105/00 | (2006.01) | |
| B29K 105/16 | (2006.01) | |
| B29L 31/10 | (2006.01) | |
| B29L 31/00 | (2006.01) | |

(52) U.S. Cl.
CPC ........ *E04F 15/02183* (2013.01); *E04F 15/22* (2013.01); *B29C 51/00* (2013.01); *B29K 2023/12* (2013.01); *B29K 2105/0026* (2013.01); *B29K 2105/0085* (2013.01); *B29K 2105/16* (2013.01); *B29L 2031/10* (2013.01); *B29L 2031/7132* (2013.01); *B29L 2031/7138* (2013.01); *E01C 2201/16* (2013.01); *E04F 2201/0146* (2013.01); *E04F 2201/021* (2013.01); *E04F 2290/044* (2013.01)

(58) Field of Classification Search
CPC .......... E04F 15/02183; E04F 2290/044; E04F 2201/0146; E04F 2201/021; B29L 2031/7138; B29L 2031/7132; B29L 2031/10; B29K 2105/16; B29K 2105/0026; B29K 2105/0085
See application file for complete search history.

(56) References Cited

U.S. PATENT DOCUMENTS

| | | | | |
|---|---|---|---|---|
| 3,108,924 A | * | 10/1963 | Adie | E04C 2/3405 181/292 |
| 3,231,454 A | | 1/1966 | Williams | |
| 3,525,663 A | * | 8/1970 | Hale | B29C 51/006 405/36 |
| 3,597,891 A | * | 8/1971 | Martin | B62D 29/04 428/178 |
| 3,802,790 A | | 4/1974 | Blackburn | |
| 3,834,487 A | * | 9/1974 | Hale | E04B 1/86 181/292 |
| 3,876,492 A | | 4/1975 | Schott | |
| 3,938,963 A | * | 2/1976 | Hale | B29D 24/002 428/582 |
| 4,029,280 A | * | 6/1977 | Golz | E06C 7/081 182/129 |
| 4,233,793 A | * | 11/1980 | Omholt | E04F 15/04 52/390 |
| 4,631,221 A | * | 12/1986 | Disselbeck | B29C 51/00 428/166 |
| 4,710,415 A | * | 12/1987 | Slosberg | A47G 27/0231 156/219 |
| 4,869,032 A | * | 9/1989 | Geske | E02D 31/02 52/169.5 |
| 4,890,877 A | | 1/1990 | Ashtiani-Zarandi et al. | |
| 5,030,501 A | * | 7/1991 | Colvin | B32B 3/12 206/522 |
| 5,085,424 A | | 2/1992 | Wood, Jr. | |
| 5,383,314 A | | 1/1995 | Rothberg | |
| 5,399,406 A | * | 3/1995 | Matsuo | B32B 3/12 428/166 |
| 5,619,832 A | * | 4/1997 | Myrvold | E02D 31/02 428/116 |
| 5,833,386 A | * | 11/1998 | Rosan | E01C 9/086 404/36 |
| 6,205,728 B1 | * | 3/2001 | Sutelan | B29C 44/12 428/182 |
| 6,715,592 B2 | | 4/2004 | Suzuki et al. | |
| 6,777,062 B2 | | 8/2004 | Skaja | |
| 7,033,666 B2 | | 4/2006 | Skaja | |
| 7,488,523 B1 | * | 2/2009 | Muncaster | B32B 11/04 404/17 |
| 7,574,760 B2 | | 8/2009 | Foley et al. | |
| 7,810,291 B2 | * | 10/2010 | McPherson | E02D 31/02 404/2 |
| 7,866,248 B2 | | 1/2011 | Moore, III et al. | |
| 8,221,856 B2 | | 7/2012 | Stroppiana | |
| 8,568,840 B2 | | 10/2013 | Sawyer et al. | |
| 8,726,424 B2 | * | 5/2014 | Thomas | A42B 3/124 2/414 |
| 9,194,136 B2 | | 11/2015 | Cormier et al. | |
| 9,394,702 B2 | | 7/2016 | Cormier et al. | |
| 9,528,280 B2 | | 12/2016 | Cormier et al. | |
| 2002/0017805 A1 | * | 2/2002 | Carroll, III | A62B 1/22 296/187.03 |
| 2003/0154676 A1 | | 8/2003 | Schwartz | |
| 2005/0133324 A1 | | 6/2005 | Soto Bailon et al. | |
| 2005/0158123 A1 | * | 7/2005 | Ianniello | E01C 3/00 405/129.95 |
| 2005/0200062 A1 | | 9/2005 | Maurer et al. | |
| 2005/0281987 A1 | | 12/2005 | Starke | |
| 2010/0203292 A1 | * | 8/2010 | Seth | B32B 27/12 428/156 |
| 2011/0135852 A1 | | 6/2011 | Sawyer | |
| 2014/0287843 A1 | | 9/2014 | Craven | |
| 2014/0311074 A1 | | 10/2014 | Cormier et al. | |
| 2014/0311075 A1 | | 10/2014 | Cormier et al. | |
| 2016/0138275 A1 | | 5/2016 | Cormier et al. | |

FOREIGN PATENT DOCUMENTS

| | | |
|---|---|---|
| FR | 2209867 | 7/1974 |
| JP | 136582 | 10/1975 |
| KR | 101011907 | 2/2011 |
| KR | 101363159 | 2/2014 |
| WO | 8203099 | 9/1982 |
| WO | 2006038029 | 4/2006 |
| WO | 2013183989 A1 | 12/2013 |

OTHER PUBLICATIONS

International Search Report and Written Opinion; International application No. PCT/US2015/014570 dated May 14, 2015.
International Search Report and Written Opinion; International application No. PCT/US2015/016103; dated May 15, 2015.
Notice of Allowance and Fee(s) Due; corresponding U.S. Appl. No. 13/865,483; dated Aug. 18, 2015.
International Preliminary Report on Patentability; corresponding International application No. PCT/2014/031333; date of issuance of report Oct. 20, 2015.
Extended European Search Report for corresponding EP application No. 15856842.8, dated Jun. 28, 2018, 9 pgs.

* cited by examiner

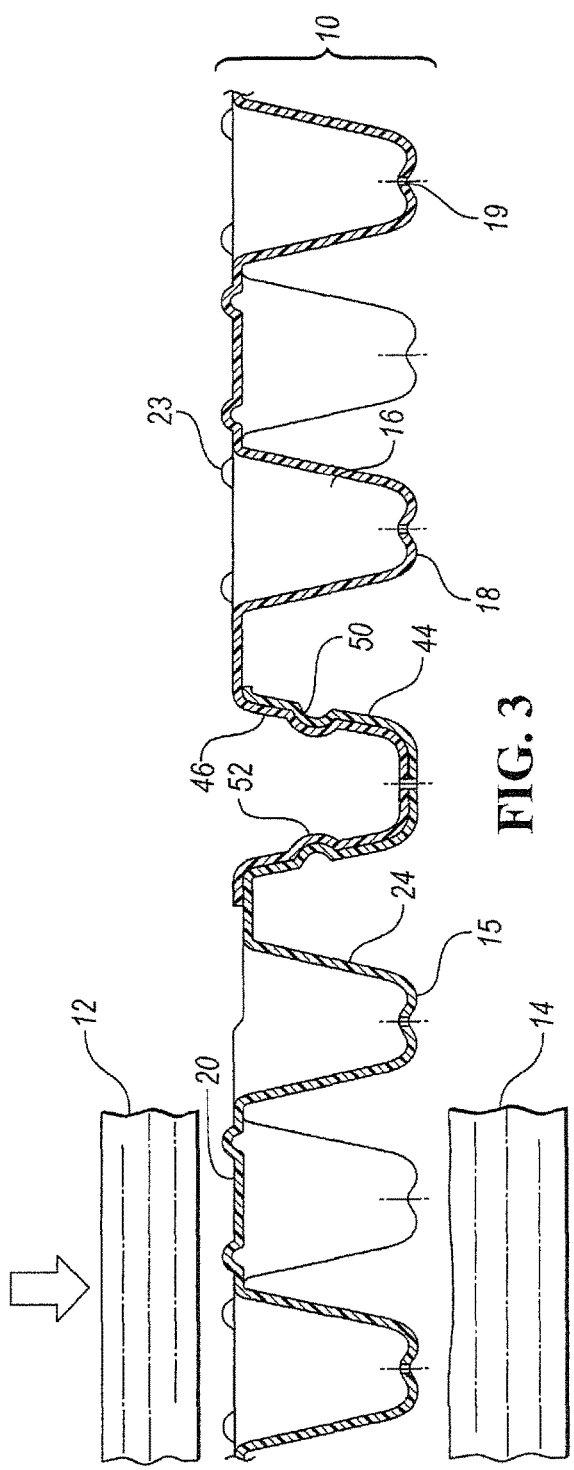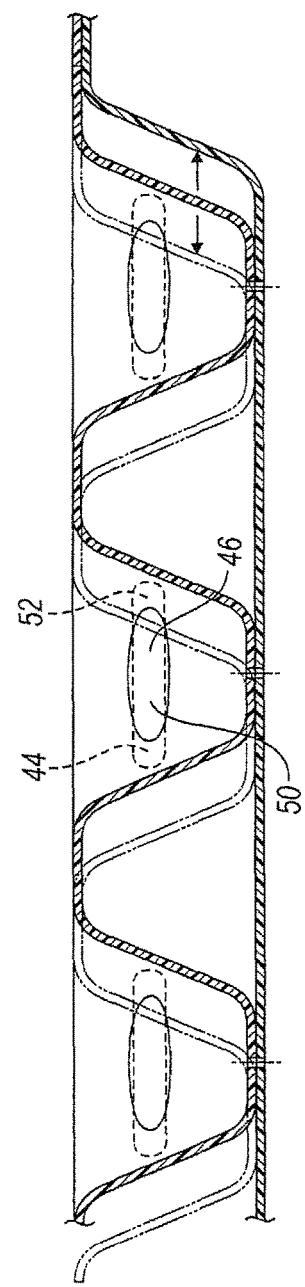

SURFACE UNDERLAYMENT SYSTEM WITH INTERLOCKING RESILIENT ASSEMBLIES OF SHOCK TILES

CROSS REFERENCE TO RELATED APPLICATION

This application is a Continuation-In-Part of U.S. Ser. No. 15/006,458 filed on Jan. 26, 2016 (to issue as U.S. Pat. No. 9,528,280 on Dec. 27, 2016), which is a Continuation-In-Part of U.S. Ser. No. 14/533,438 filed on Nov. 5, 2014 (now U.S. Pat. No. 9,394,702) and U.S. Ser. No. 13/865,483 filed on Apr. 18, 2013 (now U.S. Pat. No. 9,194,136), the disclosures of which are incorporated herein by reference in their entirety

TECHNICAL FIELD

Several embodiments of this disclosure relate to articles of manufacture and methods for providing a surface underlayment system with assemblies of interlocking resilient shock tiles or modules.

BACKGROUND

Modular energy absorbing panels which interlock or snap together to create a resilient underlayment system or "shockpad" are disclosed for example in commonly owned U.S. Pub. No. 2016/0138275. Such shockpads system lie between a foundation or reaction surface and the surface that receives the impact. Examples of reaction surfaces include planar or undulating compacted soil, crushed stone, concrete, asphalt, wood, decking, and other rigid surfaces. Examples of impact receiving surfaces include artificial turf for sports such as golf, football, lacrosse, soccer, lacrosse, baseball, cricket, field hockey and the like. Also included are flooring surfaces such as carpet, vinyl, plastic materials, thermoset materials, wood, steel and composite structures.

Ideally, the interposed underlayment system absorbs and redistributes at least some of the energy applied by an impacting object such as a football helmet or a golf ball through flexure of the underlayment system. In the case of synthetic turf, one desirable feature is for the underlayment system to mimic the response of natural grass during and after impact. Further non-limiting examples of the impacting object include a soccer ball, a baseball, and a lacrosse stick. The behavior of a golf ball before, during and after impact with a playing surface is of particular interest to sports enthusiasts and their governing bodies.

One aspect important to any underlayment system is the ease and cost of installation of the underlayment system. While the addition of a pad or underlayment system complicates the installation of the entire system, it would be desirable to minimize the amount of time, effort, and costs associated with the overall system installation.

U.S. Pub. No. 2106/0138275 describes a modular energy absorbing system comprising a series of individual panels which snap together to create a resilient system which, once installed, improves the performance of the overall turf system. Against this background it would be desirable to reduce the cost, time and effort of system placement at an installation site.

Commercially available flooring products such as Pergo® and other flooring laminates enable component parts of the receiving surface to click or snaps together independently of the underlayment system. In such cases, the underlayment system installation precedes the flooring or cover surface installation. Ideally, it would be desirable to create a system where the underlayment and the impact receiving surface can be installed simultaneously.

In an industrial setting, flooring systems are sometimes provided that absorb forces generated by repeated footfalls. Playground systems also require some means of absorbing energy to reduce the risk of serious injury when a child falls on the surfaces beneath and around playground structures.

In an effort to improve the consistency of the turf and flooring systems, several shockpad systems have been developed and deployed in recent years. The three main categories for of such systems are pour in-place products, rolled goods, and panels.

Pour in place systems are applied in a manner similar to cement or asphalt. Ground crumb rubber is combined with a thermosetting binder and then manipulated using conventional paving equipment. Once cured, these systems compliment the performance of the turf system. Historically, these systems have been prone to variation based on the installed thickness and chemical mixing of the binder and rubber. They are also more prone to breakdown due to several factors. They are permanent and require the use of heavy equipment to install.

Rolled goods are one of the easiest materials to install. Large rolls of foam are unrolled and then either taped or stitched together to create a uniform surface. Rolls are produced from a variety of materials including ground polyurethane foam, ground tires, rubber, cross-linked olefin foams, and expanded polypropylene foam. These materials typically tend to have issues with expansion and contraction under the cover surface and are relatively in-efficient in their ability to absorb energy.

Foam panels, typically made from low density EPP foam with or without formed interlocking sections have also been used. These systems react well to expansion and contraction. However their light weight and low density proves challenging during both installation where they have a tendency to "sail" in the wind.

For synthetic turf golf greens, the shockpad systems which lie below the synthetic turf are typically multi-layered systems. The shockpad typically includes a matrix of fibrous material that is filled with sand. Synthetic turf is laid over the top of the shockpad and then sand is added for balance. These types of systems rely largely relying on the sand to dissipate a large percentage of the incoming energy in a manner similar to natural grass greens such as the Shotstopper® system developed by Synlawn® owned by Astro-Turf®. These types of systems may be expensive and the installation process is slow. The system profile is thick. A large volume of sand needs to be worked into the fibrous material. This takes a substantial amount of sand, time, and labor. The ideal system would be inexpensive, low profile, easy to install and duplicate the performance of natural grass upon installation.

SUMMARY OF THE INVENTION

Against this background, it would be desirable to provide an article of manufacture, its method of making and method of installation that includes a surface underlayment system. The underlayment system has subassemblies of interlocking resilient energy absorbing modules ("building blocks") that accommodate thermal expansion or contraction and can be usefully deployed indoors or outdoors in all weather conditions. Preferably the modules are quadrilateral.

In this context, the individual modules serve as building blocks that when united form subassemblies that can conform with a planar or undulating lower foundation without buckling. One example of a subassembly is a row or elongated strip of modules in which adjacent modules are united along two opposite edges to form for instance a subassembly of 1×25 modules (width times length) that can be rolled up at a production facility before shipping to the installation site. When joined along one or more edges the subassemblies form an assembly. The assembly may for example be embodied as a golf putting green or a football field.

In some applications, subassemblies of modules are economically nested or stacked before transportation to a job site. This step enables minimal installation costs to be realized. As delivered, the subassembly itself or multiple subassemblies that are united to form an assembly are compatible with a lower foundation and an upper impact-receiving surface between which they are interposed (collectively, "energy absorbing composite"). After installation, the energy absorbing composite requires little or no maintenance.

To reduce the time and effort of system placement at an installation site, relatively large subassemblies of pre-assembled panels can usefully be put together at a production facility. They can then be folded in concertina-fashion or rolled and shipped to the installation site without separating adjacent modules in a subassembly during shipment or deployment. Larger pre-assembled panels reduce the amount of handling and costs associated with the assembly of individual panels on site. Ideally, a cost-effective system of pre-assembled panels would ship to the job site with a high packaging density. This reduces the cost of shipping, handling, and installation of the underlayment system to and at the installation site.

To emulate the response of natural grass, it may also be desirable to add within the underlayment system granular material such as sand, ground tire rubber, elastomeric pellets, and the like. This promotes the movement of particulates. For example, after tuning the response characteristics by for instance altering the location and amount of particulates, the bounce of a golf ball after landing on natural grass resembles the bounce after hitting an impact receiving surface that is supported by an underlayment system. In such cases, tuning the installed energy absorbing composite can result in a spring back of the underlayment system after the ball has bounced from the impact receiving surface. Such phenomena are of interest in sports played with non-inflated balls such as golf, baseball, softball, field hockey, cricket and lacrosse. Ideally, the underlayment system stiffness and performance can be tuned to mimic the response of natural grass in combination with a synthetic turf system.

Furthermore, such a system if capable of being installed and removed rapidly would be attractive to owners and operators of multi-use indoor facilities. One example is a hockey rink which is converted to indoor soccer or a basketball court during the hockey off season and then removed and stored while hockey is played. Another example would be a special forces boat deck where the deck may be configured for specific mission parameters. A further example would be a temporary installation of a system within a home or assisted living facility where individuals are at increased risk of injury caused by falls due to certain medical conditions.

In many such cases, the storage space in any facilities is limited space, so the ideal system would nest together and occupy as little space as possible until reinstalled.

BRIEF DESCRIPTION OF THE DRAWINGS

FIG. 3 is a sectional view of an underlayment system including an impact-receiving surface, the underlayment layer and a lower foundational layer, taken along the line 3-3 of FIG. 2;

FIG. 4 is a sectional view taken along the line 4-4 of FIG. 2;

DETAILED DESCRIPTION

Figure 1:
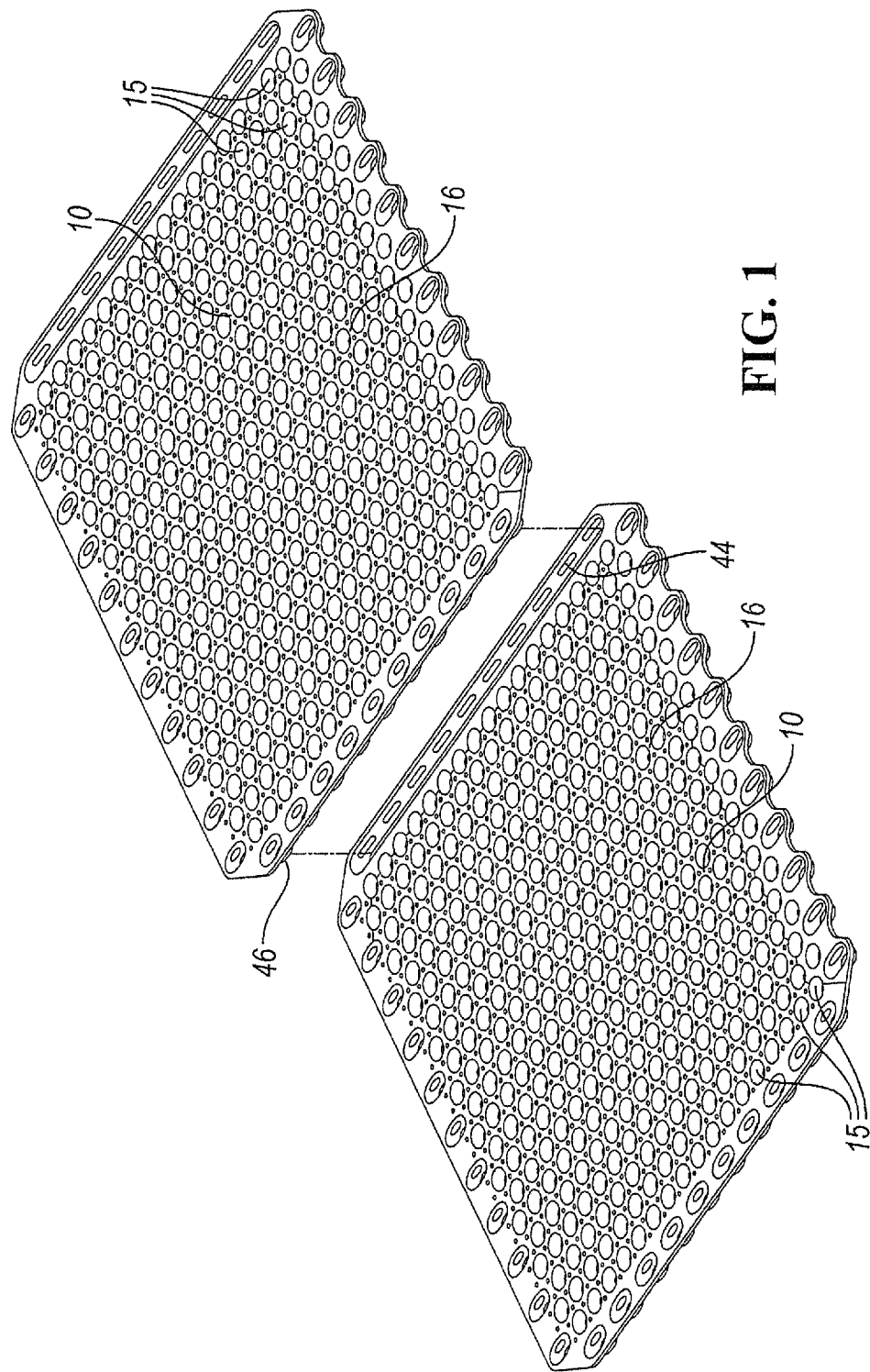
FIG. 1 is an exploded view of two adjacent energy absorbing building blocks or modules of an underlayment layer that are interlocked in a partially overlapping configuration to form a subassembly.
Figure 2:
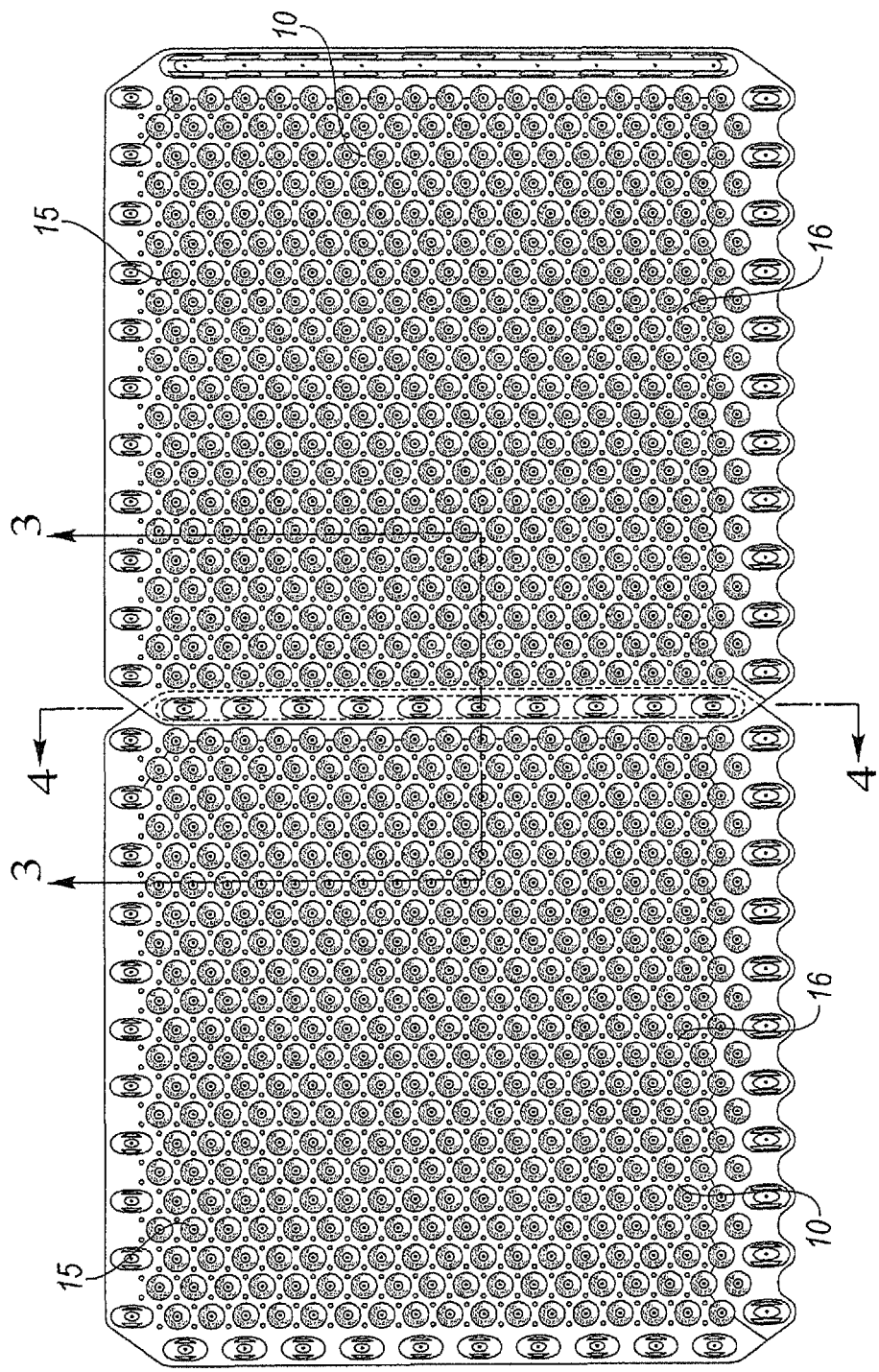
FIG. 2 is a top view which illustrates two modules after being interlocked by being joined along two common edges.
Figure 6:
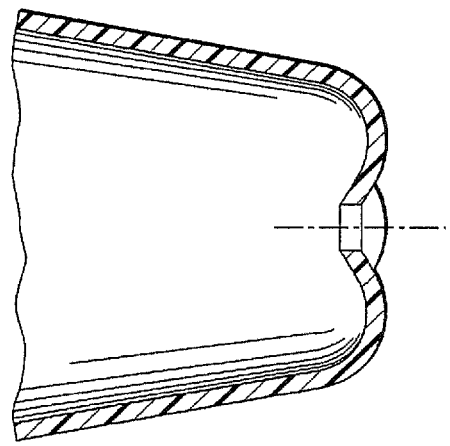
FIG. 6 is a sectional view thereof along the line 6-6 of FIG. 5.
Figure 5:
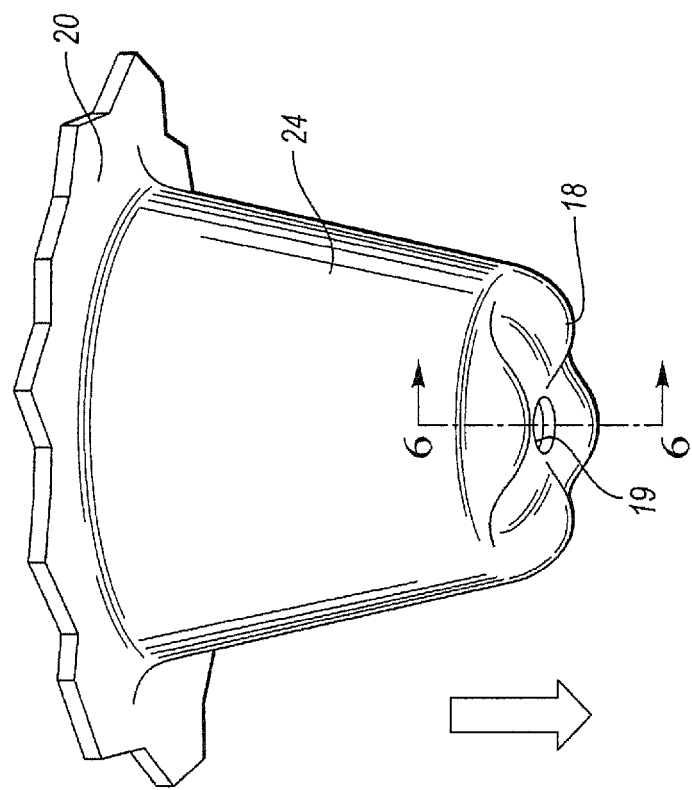
FIG. 5 is a perspective view of an alternate embodiment of one element of the energy absorbing module, namely a frustoconical energy absorbing support structure.
Figure 7:
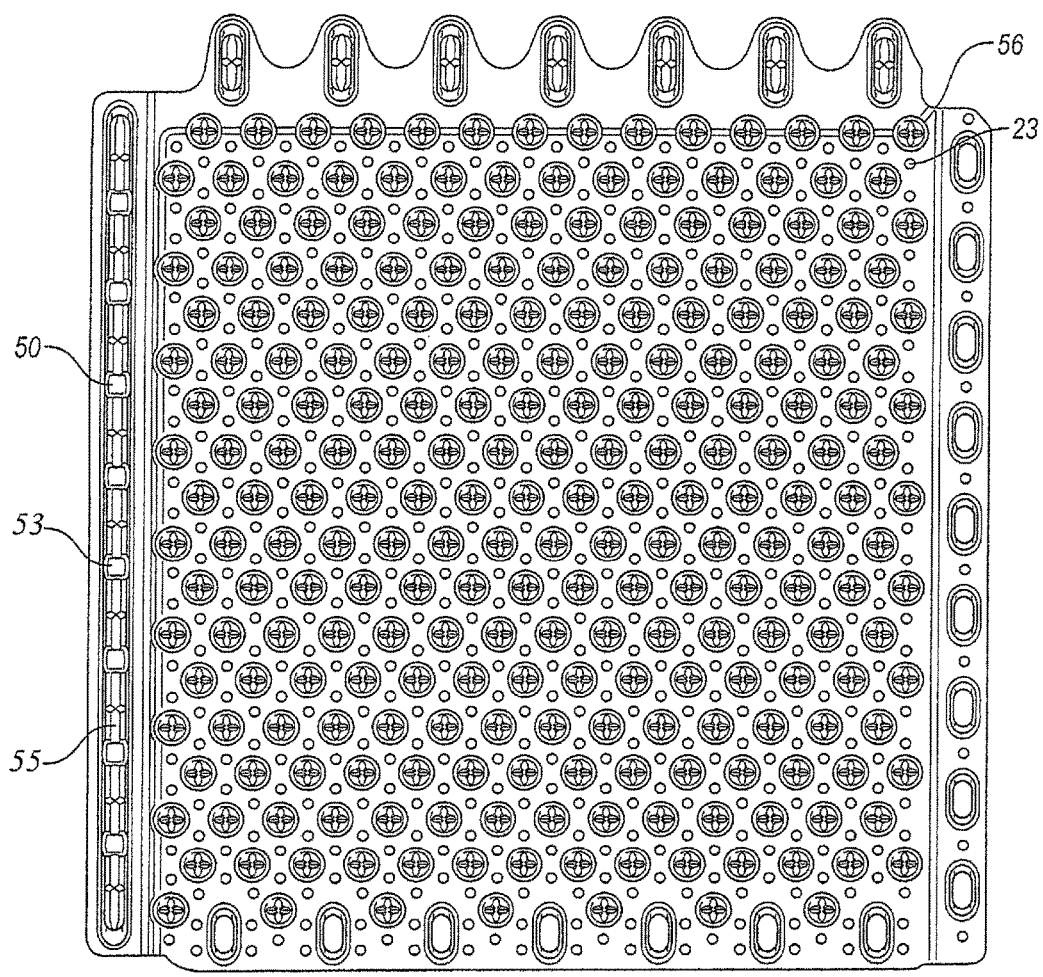
FIG. 7 is a top view of a second embodiment of a single module.
Figure 8:
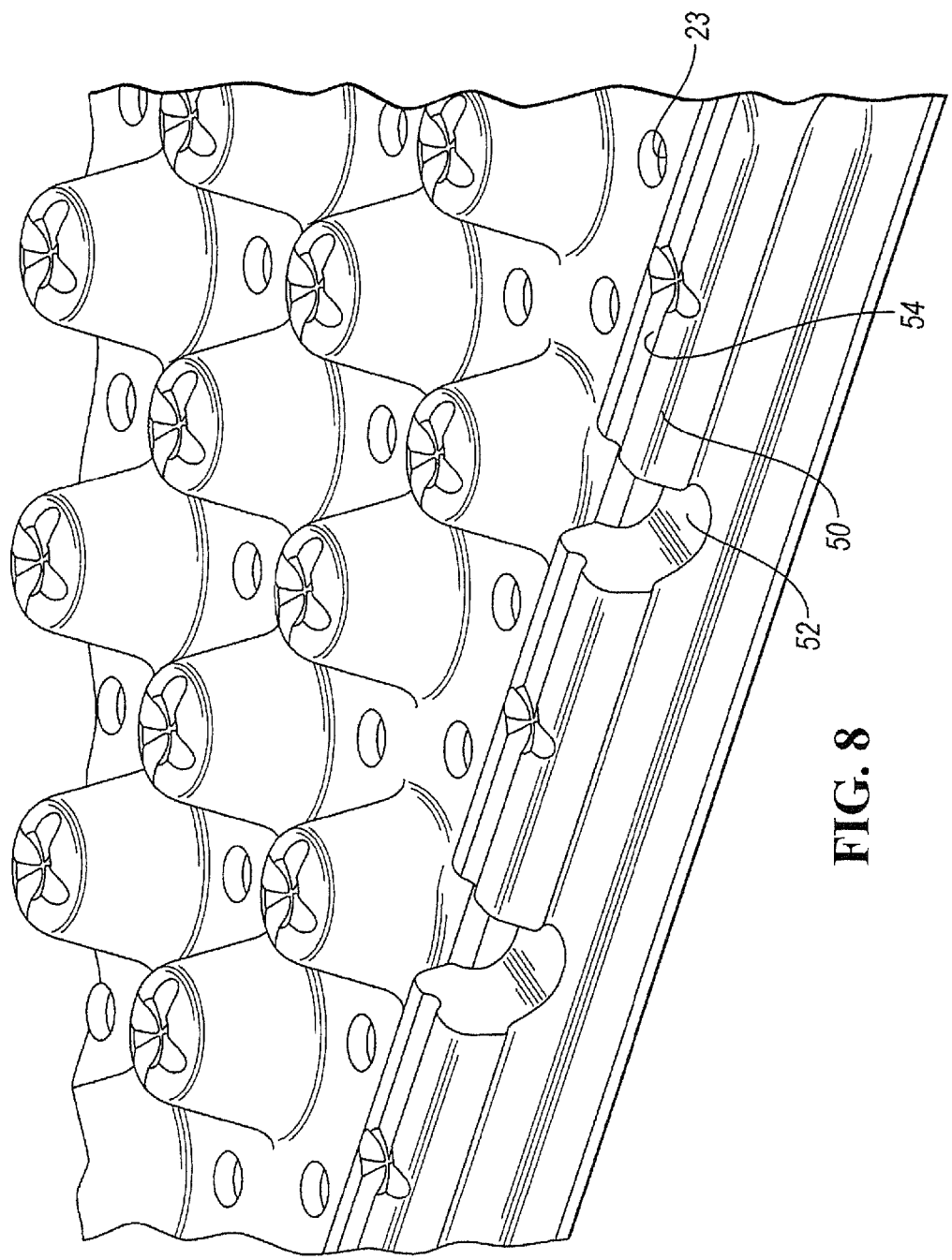
FIG. 8 is an enlarged perspective view of a portion of the second embodiment.
Figure 9:
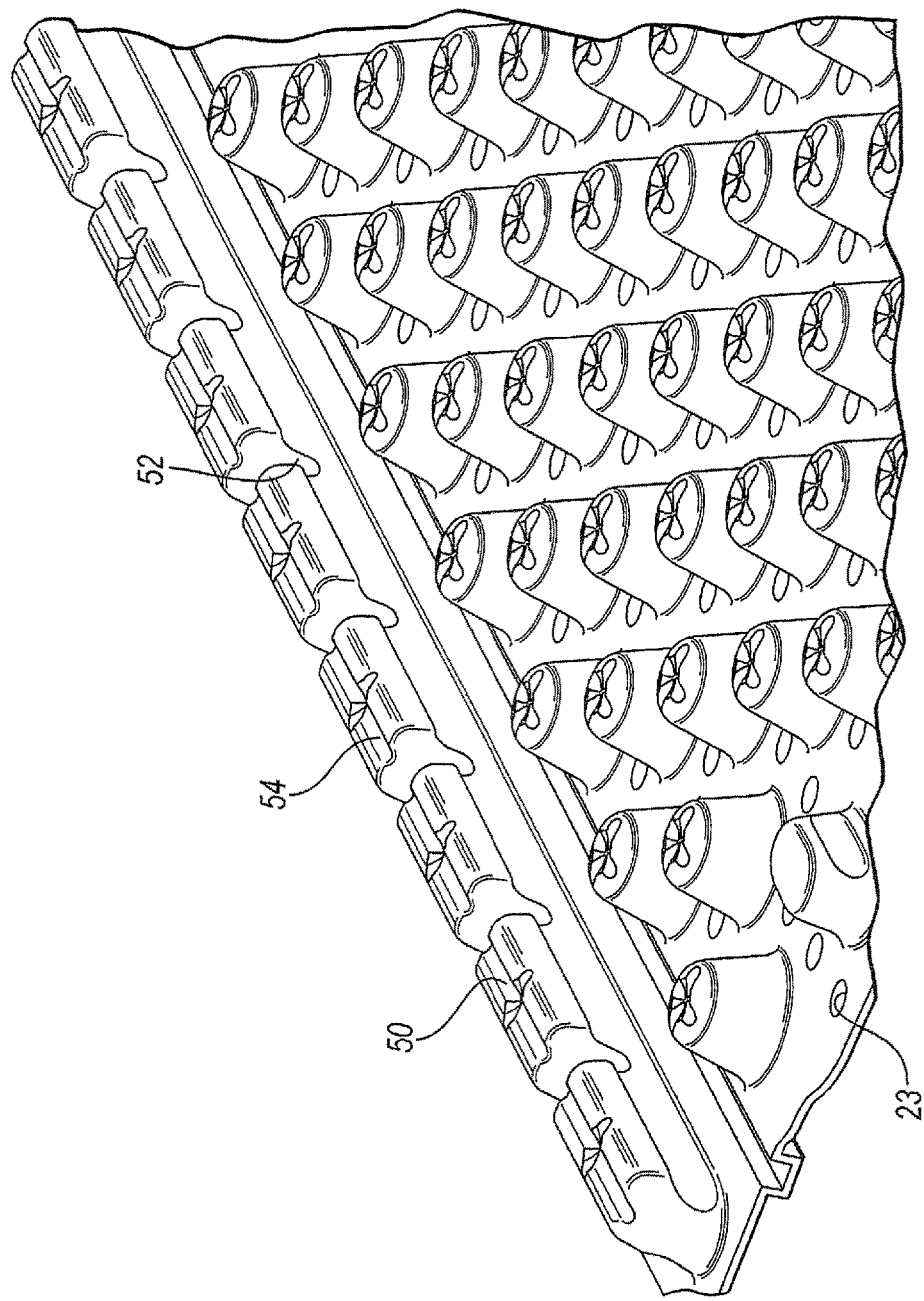
FIG. 9 is also an enlarged view of a portion of the second embodiment as seen from a different vantage point from that of FIG. 8.
Figure 10:
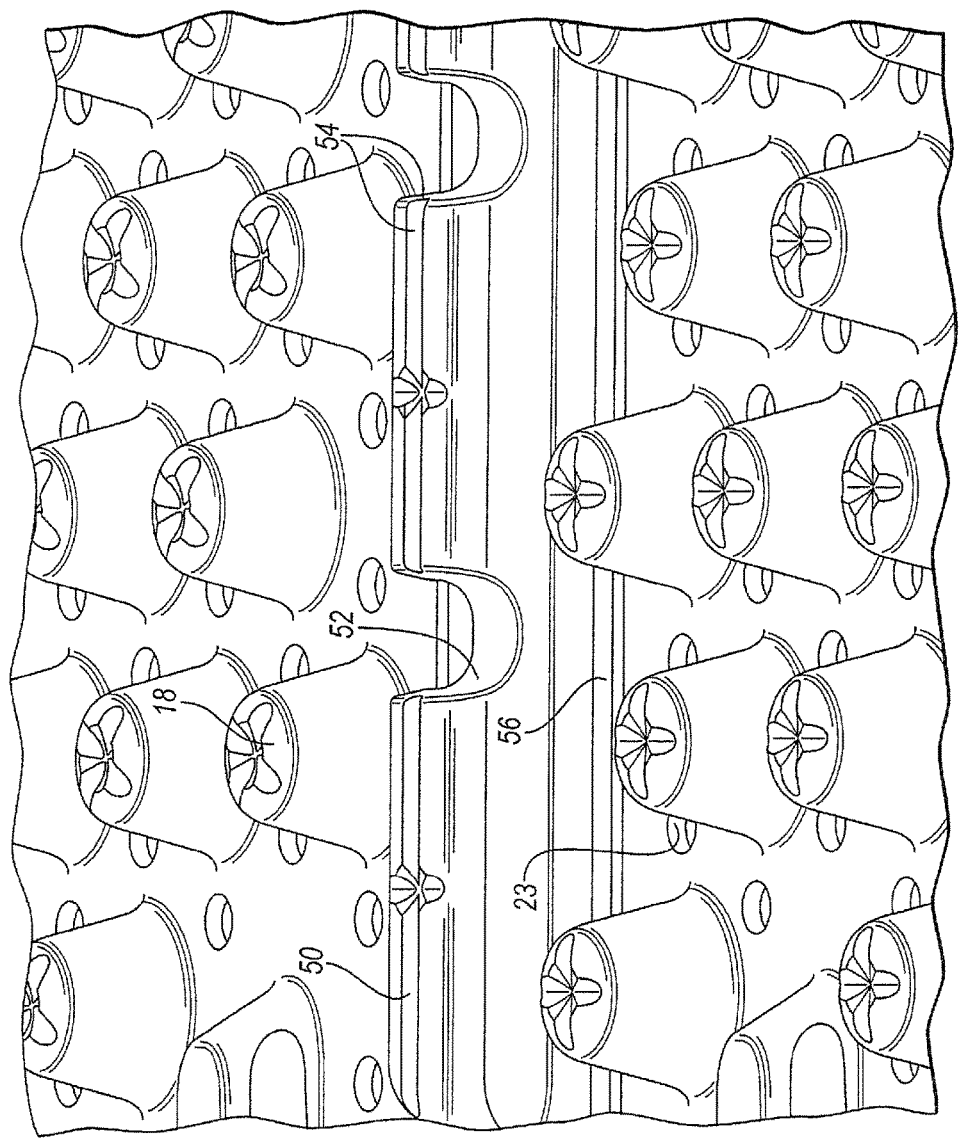
FIG. 10 is an enlarged perspective view of portions of two modules after they are juxtaposed.
Figure 11:
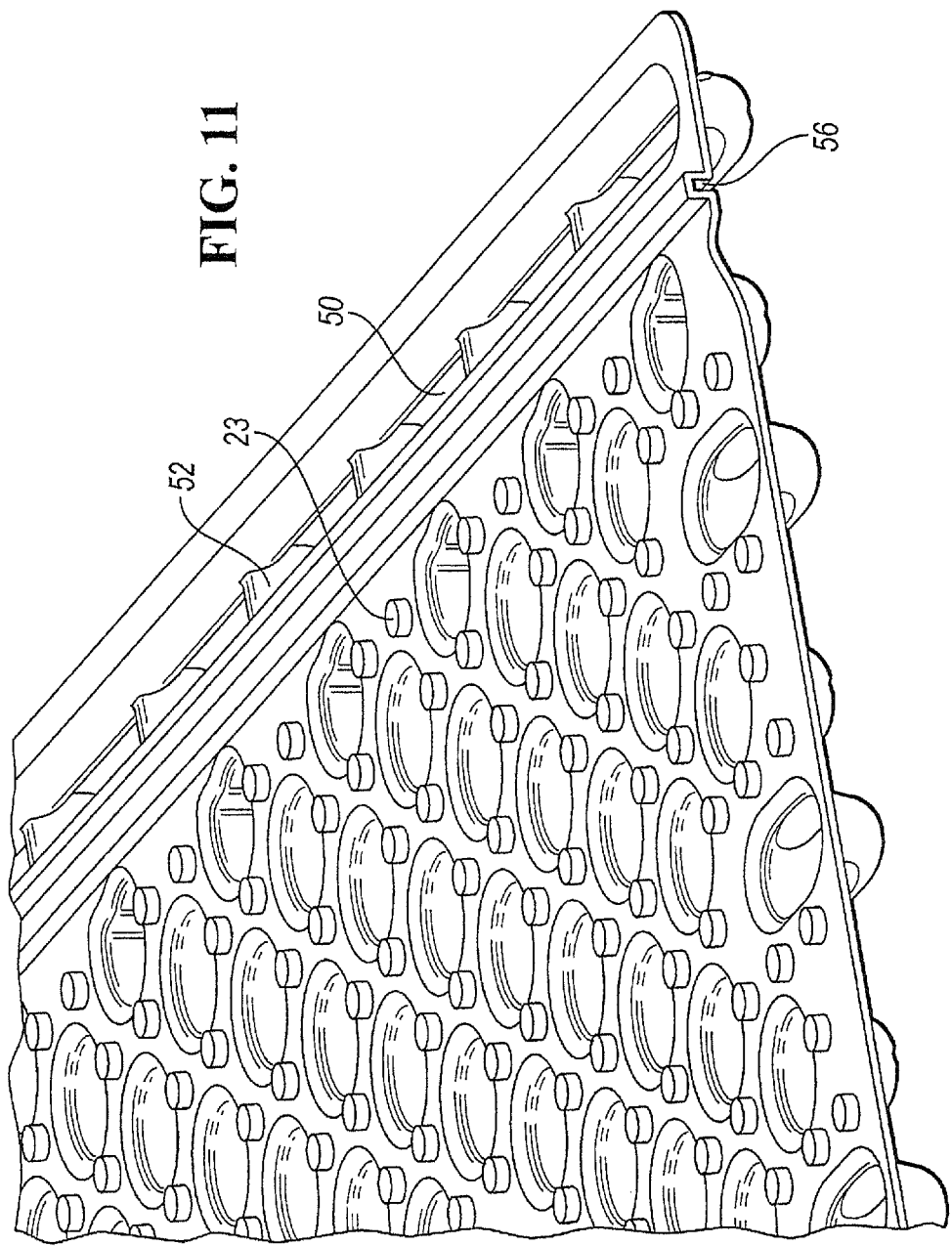
FIG. 11 is a view of the underside of the embodiment depicted in FIG. 8.
Figure 12:
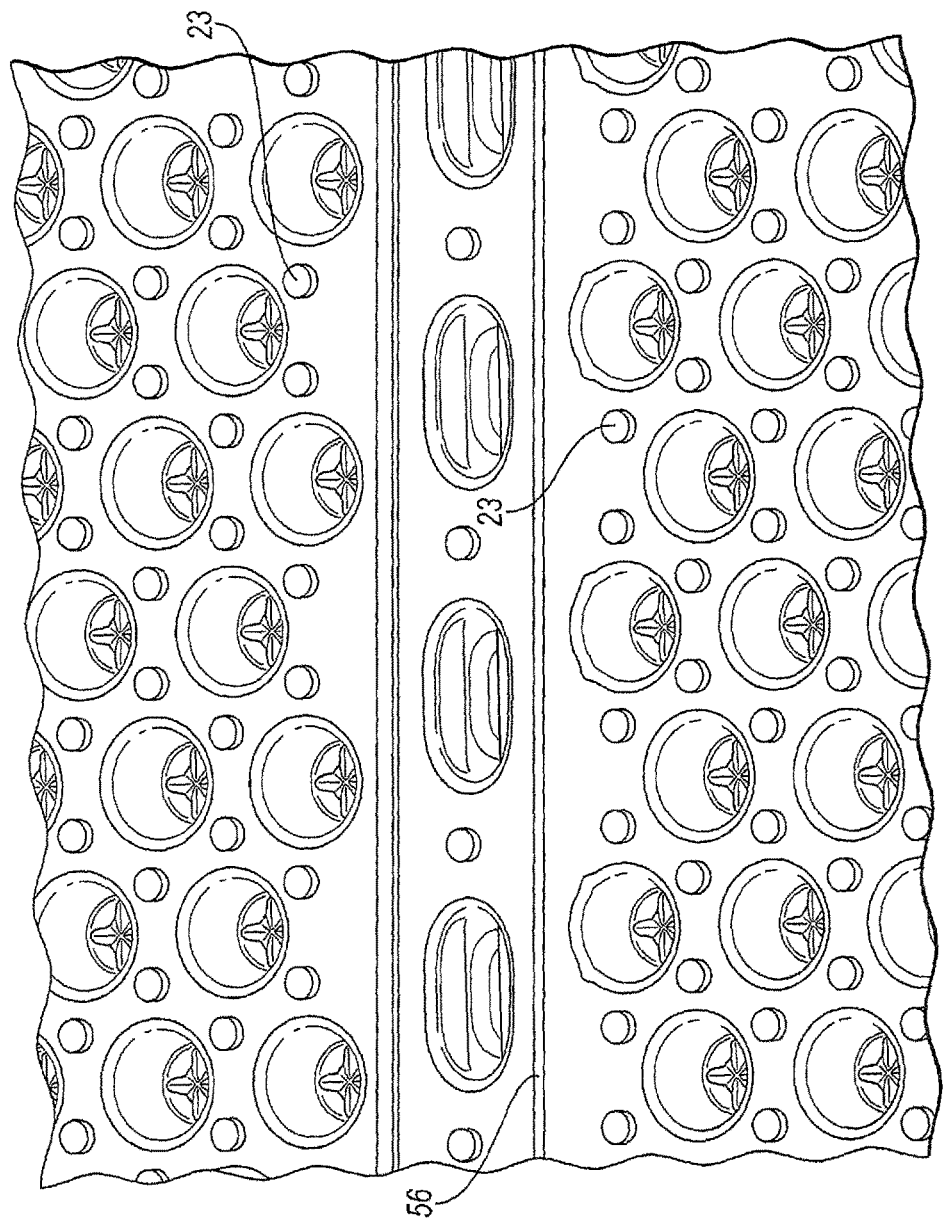
FIG. 12 is a view of the underside of the embodiment depicted in FIG. 10.

It is to be appreciated that this disclosure encompasses an interim and final article of manufacture, its method of making and method of installation that include a surface underlayment system. The underlayment system has subassemblies of interlocking energy absorbing modules that remain united during shipment and accommodate thermal expansion or contraction. Such subassemblies can be unrolled or disassembled at an installation site. Upon joinder to form assemblies, the surface underlayment system can be usefully deployed indoors or outdoors in all weather conditions.

Preferably the modules are quadrilateral with lateral and longitudinal edges. The individual modules are "building blocks" that when united form subassemblies. One example of a subassembly is a row of modules in which the modules are united across two opposite edges to form for instance a subassembly of 1×25 modules that can be rolled at a production facility before shipping to the installation site. When joined along one or more edges the subassemblies form an assembly. The assembly may for example be embodied as a golf putting green or a football field.

In some applications, subassemblies of modules are economically rolled or nested or stacked before transportation to a job site. This step enables minimal installation costs to be realized. As delivered, the subassembly itself or multiple subassemblies are united to form an assembly. In use the assembly is compatible with a lower foundation and an upper impact-receiving surface between which the assembly is interposed, thus presenting an energy absorbing composite. After installation, the energy absorbing composite requires little or no maintenance.

To reduce the time and effort of system placement at an installation site, relatively large subassemblies of modules can usefully be put together at a production facility. If desired, the modules can be snap-fitted together across common edges. Additionally or alternatively, ties or straps can usefully cause adjacent modules to stay together during shipment and deployment. The modules can then be folded or rolled and shipped to the installation site without separating adjacent modules in a subassembly during shipment or deployment. Larger pre-assembled modules reduce the amount of handling and costs associated with the assembly of individual modules on site. Ideally, a cost-effective system of pre-assembled modules are shipped to the job site with a high packaging density. This reduces the cost of shipping, handling, and installation of the underlayment system to and at the installation site.

One aspect of this disclosure involves a first embodiment of a modular surface underlayment system 10 (FIGS. 1-6) that lies between an upper surface 12 and a lower foundation 14 as best shown in FIG. 3. Other embodiments (FIGS. 7-12) are discussed below. In each embodiment, the system 10 has interconnected, preferably one or more thermoplastic tiles or modules 16 that cooperate to manage energy absorption or distribution following a blow imparted to the upper surface 12 from above, while maintaining their structural interrelationship in the face of thermal expansion and contraction responses to changing environmental conditions. Each module 16 is configured to cushion the blow by absorption and/or force re-distribution laterally.

In more detail, at least some of the modules 16 have an array of preferably frustoconical energy absorbing support structures 15. Optionally, ribs (not shown) connect at least some of the frustoconical structures 15. As used herein the term "frustoconical" includes a generally conical structure, the end of which has been truncated, perhaps by a planar or undulating surface (bottom surface 18, FIG. 3) that may be parallel or inclined to its top surface 20. The bottom surface 18 is also termed what in the game of chess is sometimes called a "rook".

The bottom surface 18 of the frustoconical energy absorbing support structures 15 may or may not be circular. It could for example be oval, elliptical, square, rectangular, triangular, hexagonal or generally polygonal. Effectively the structures 15 serve as support pillars with sidewalls 24 (FIG. 3) that rise from the bottom surface 18 and are configured to support the weight for instance of a 250 lb. person without collapsing. In response to impact, depending on the impacting force, the sidewalls 24 buckle and may or may not spring back to or towards an undeflected configuration, thereby absorbing or redistributing at least some of the forces that accompany impact upon the upper surface 12.

It will be appreciated that the terms "top", "bottom", "upper" and "lower" should be construed as non-limiting. For example any of the modules 10 could be inverted. In that case the bottom surface 18 could become juxtaposed with and lie below the upper surface 12.

In a preferred embodiment, the top surfaces 20 of the frustoconical structures 15 interface with the upper surface 12, such as an artificial turf or a hard playing surface. The top surfaces 20 are generally planar and are roughly parallel to the bottom surfaces 18. Where the frustoconical structure 15 has a bottom surface 18 that resembles a rook with crenellations, the crenellations have upper edges that are generally co-planar (see, FIGS. 5, 6).

In one preferred embodiment (see, e.g., FIGS. 1-4), the modules 10 provide mutual support. They coordinate with and connect to one another, despite having features described below that accommodate thermal expansion and contraction. To attach adjacent modules 10, oval female troughs or recesses 44 (FIG. 3) are provided in a peripheral edge flange of a module that engage male protuberances 46 in a peripheral edge flange of an adjacent module. The oval female recesses 44 are oriented so that they are preferably substantially aligned with a major component of a direction of thermal expansion and contraction. When a male protuberance 46 is engaged by a female recess 44, unidirectional relative movement therebetween can be accommodated without the buckling of adjacent modules 10.

If desired, lugs 50 and grooves 52 (FIG. 3) can be provided in the walls of male 46 and female 44 members (or vice-versa) to provide a snap-fit engagement mechanism between adjacent modules 10. The lugs 50 and grooves 52 may be defined continuously or intermittently in the sidewall 44, 46. Optionally, a flooring surface 12 can be laminated to the underlayment system 10. In this embodiment, the cone array 15 and male members 46 are covered by the flooring surface 12 and the female members 44 exposed. When the laminated system is snapped together, the sides of the flooring surface butt together, thereby creating a continuous surface.

The surface underlayment system 10 may include a number (n) of modules 10 (where 1<n<1,000,000) depending on the desired footprint on the lower foundational surface 14 over which the system 10 is installed.

One feature of the disclosed structure is that when the upper surface 12 overlies the modules 10, a firm feel under foot is experienced that is relatively uniform over the middle region of a module 10 and over its edges or peripheral flanges that overlap with those of adjacent modules 10. Preferably, the weight of for example, a pedestrian or player is distributed evenly over multiple frustoconical structures 15 associated with one or more modules.

In some cases, (e.g., FIGS. 3, 4) a module 16 is positioned so its undulating cone top surface 18 engages an underlying foundation or support structure 14. Undulations are provided to enable point contact between the surface 18 and the underlying support surface 14, as contrasted with an area of contact. If desired, apertures 19 can be provided in at least some of the cone bottom surfaces 18 or top surfaces 20 for drainage and weight reduction. One purpose of the rook-like feature is that when there is a hole 19 in the contoured surface, the hole 19 does not plug when placed adjacent to a flat surface such as a concrete floor or flat planar surface 14. If the rook feature is not present, then the perforation seals against the flat surface 14 and prevents water from draining through the system.

Once the complete modular system 10 has been installed, it may be covered with an upper surface 12, such as a putting green, a basketball arena or gymnasium floor or layers of permeable materials like synthetic turf, natural grass, sedum, geotextiles, and the like to create a finished surface that is both functional and aesthetically pleasing. A preferred embodiment has a geo textile beneath the underlayment system 10. Other embodiments include a geotextile beneath and above the underlayment system 10. The lower geotextile prevents the system 10 from settling into the lower foundation 14 and fine particulates from migrating upward. In one embodiment, a preferred geotextile includes a non woven needle-punched polypropylene having a density of about 90 gm/sq. meter. The upper geotextile prevents the migration of infill materials such as sand and crumb rubber through the carpet and into underlying recesses. If desired, the system can utilize green products in the upper surface 12. As used herein the term "green product" includes products that have these among other attributes:

energy efficient, durable and often have low maintenance requirements.

free of Ozone depleting chemicals, toxic compounds and don't produce toxic by-products.

often made of recycled materials or content or from renewable and sustainable sources.

obtained from local manufacturers or resources.

biodegradable or easily reused either in part or as a whole.

See, http://www.isustainableearth.com/green-products/what-is-a-green-product.

It will be appreciated that the upper surface 12 can be laid across or secured to one or more modules 10. Optionally, a flooring surface 12 can be adhered or laminated to the underlayment system 10. In this embodiment, the cone array 15 and male members 46 are covered by the flooring surface 12 and the female members 44 exposed. When the laminated system is snapped together, the sides of the flooring surface butt together, thereby creating a continuous surface. Optionally, anti-friction lugs 23 (FIG. 3) are provided in the upper surface 20 to eliminate or reduce slippage between the energy absorbing module 10 and the upper surface 20. Similarly, anti-friction lugs can be provided in the bottom surface 18 of at least some frustoconical structures 15 to reduce slippage over the lower foundation 14.

This disclosure now turns to other embodiments (FIGS. 7-12), in which a long channel 50 is punctuated by traverse ribs 52. Optionally, longitudinally oriented ribs 54 may be provided between the transverse ribs 52. Such structures provide a positive engagement or adequate snap retention between adjacent tiles, panels or modules. Without the ribs 52, the long continuous channel 50 may open up too easily and adjacent tiles may undesirably slide or become separated prematurely. Between the long interlocked channels 50 and the lugs 23 a shallow u-shaped channel 56 runs along one side of the module 16. The channel 50 allows for expansion and contraction perpendicular to the channel 50.

It will be appreciated that the disclosed underlayment system may not only underlie artificial turf but also other flooring systems. The drainage holes 19 are optional. In some applications, for example where the upper impact-receiving surface includes an impermeable surface such as a running track, gym floor, floor tile, etc., there may or may not be a benefit from having the rook top 18. These include turf underlayment, playground underlayment, and other systems where the underlayment lies between a wear surface and a drainage system.

One aspect of the system disclosed is that interaction between plastic and a flat surface may be noisy. For example, the system may flutter when displaced relative to the surface above or below and generate sound at a decibel level that may be objectionable. Therefore, alternate embodiments include a thin foam or felt layer interposed between the upper surface 12 and the disclosed energy absorbing system. For instance, most turf systems are installed over a compacted stone base. In such applications, a permeable non-woven or woven polypropylene geo textile not only deadens the noise but also prevents the disclosed system from settling substantially into the stone base or the stone base from migrating up between the frustoconical structures 15. This thin layer promotes drainage but also prevents relative movement or migration of adjacent layers. In an indoor environment, placement of a foam or felt pad underneath the energy absorbing system would tend to deaden that noise.

It will be appreciated that the underlayment systems may or may not be recoverable. For example, a non-recoverable polypropylene or thermoplastic urethane or other thermoplastic may be suitable for use in basements when moisture and mildew could otherwise be an issue. In such applications, the energy absorber 10 would not crush significantly, let alone recover to or toward an undeflected state. Instead of cushioning the blow by deformation, resistance to impact would be relatively inelastic. Then in the absence of drainage holes, the disclosed system would constitute a reservoir or vapor barrier. As used herein the term "thermoplastic" means "a polymer material that becomes pliable with heat, and with sufficient temperature, a liquid. When cooled, thermoplastics return to solid." See:
http://lookup.computerlanguage.com/host_app/
    search?cid=C999999&term=thermoplastic&lookup.x=
    0&lookup.y=0

Besides injection molding, one method by which to manufacture the disclosed system is thermoforming. Such approaches enable easy performance tuning by changing sheet thickness and material type that is thermoformed over the tool. It will be appreciated that thermoforming lends itself to rapid high volume manufacturing and low manufacturing costs. Ideally, a polyolefin thermoplastic, such as a polypropylene copolymer, offers an optimal balance of cost and performance. Additional materials may be compounded into the thermoplastic, such as flame retardant packages, to meet customer building codes or performance criteria.

Figure 13:
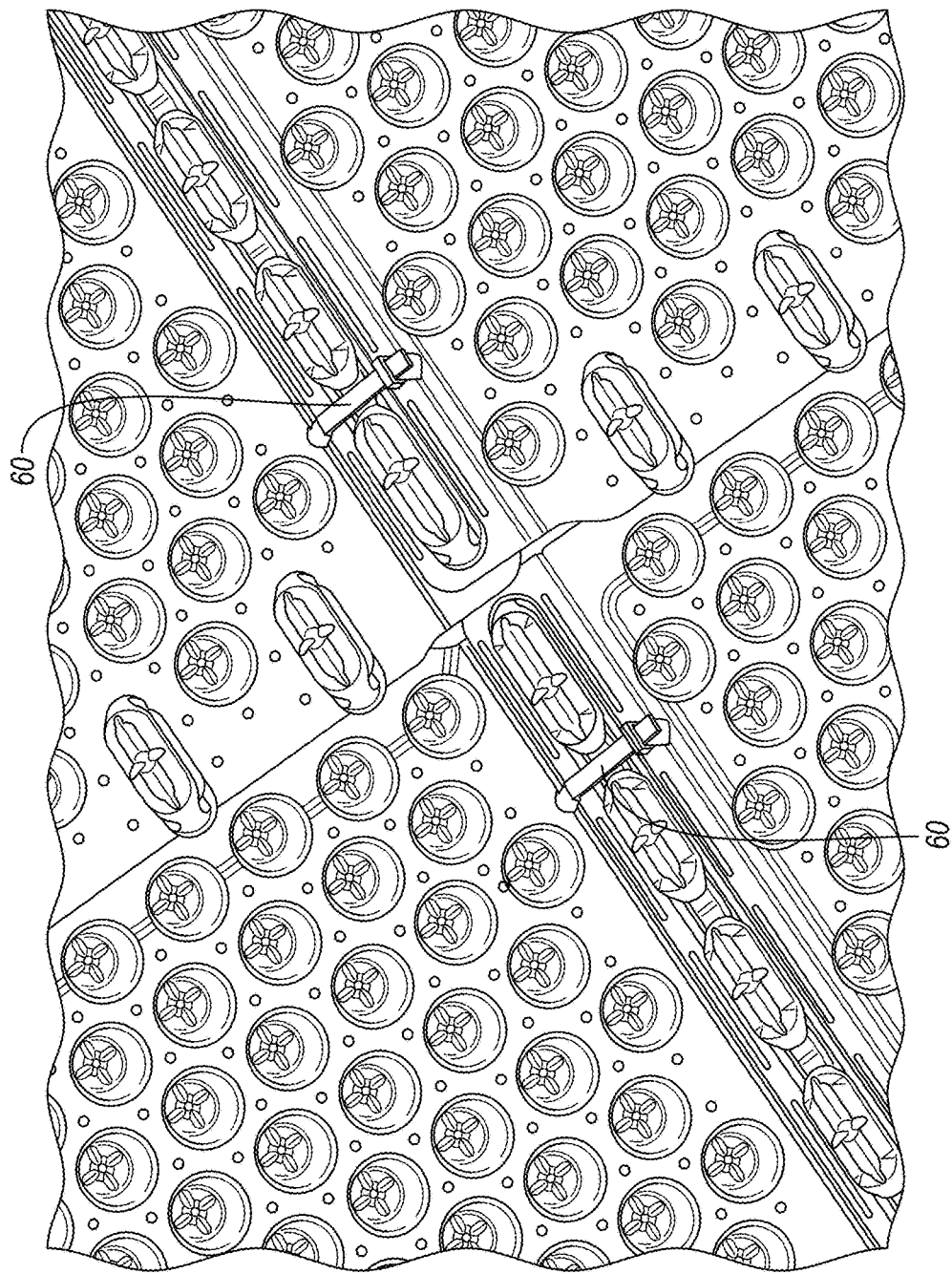
FIG. 13 is a top quartering perspective view of a portion of a subassembly of four modules that are united along their common longitudinal and lateral edges, including optional straps that lie across a common boundary to secure the subassembly during shipment and installation if desired.

Depicted in FIG. 13 is a subassembly including four modules 16 that are interconnected in the installed state. The number of modules can be two or more. Adjacent individual modules 16 are snapped together at the manufacturing location and subsequently fastened permanently to one another using commercially available fasteners such as zip ties 60 at several locations along the peripheral edges of the modules 16. If desired slits can be made in the peripheral edges that can accommodate the straps or twist ties. Pre-engineered points of weakness, such as thinned areas or slits can usefully provide a living hinge if needed.

Based upon the width of the installation, it may be desirable to have an integral number of sub-assemblies span the length or width or length of a particular installation (for example, a football field) in order to minimize the number of edge cuts around the periphery. Between ten and twenty panels per subassembly is a preferred range for one to two installers per subassembly. The subassembly reduces the installation time since fewer parts are handled and aligned for installation. The number of snaps requiring assembly on site is roughly 70% less than installing individual panels. This reduces the time and labor required for assembly.

Figure 14:
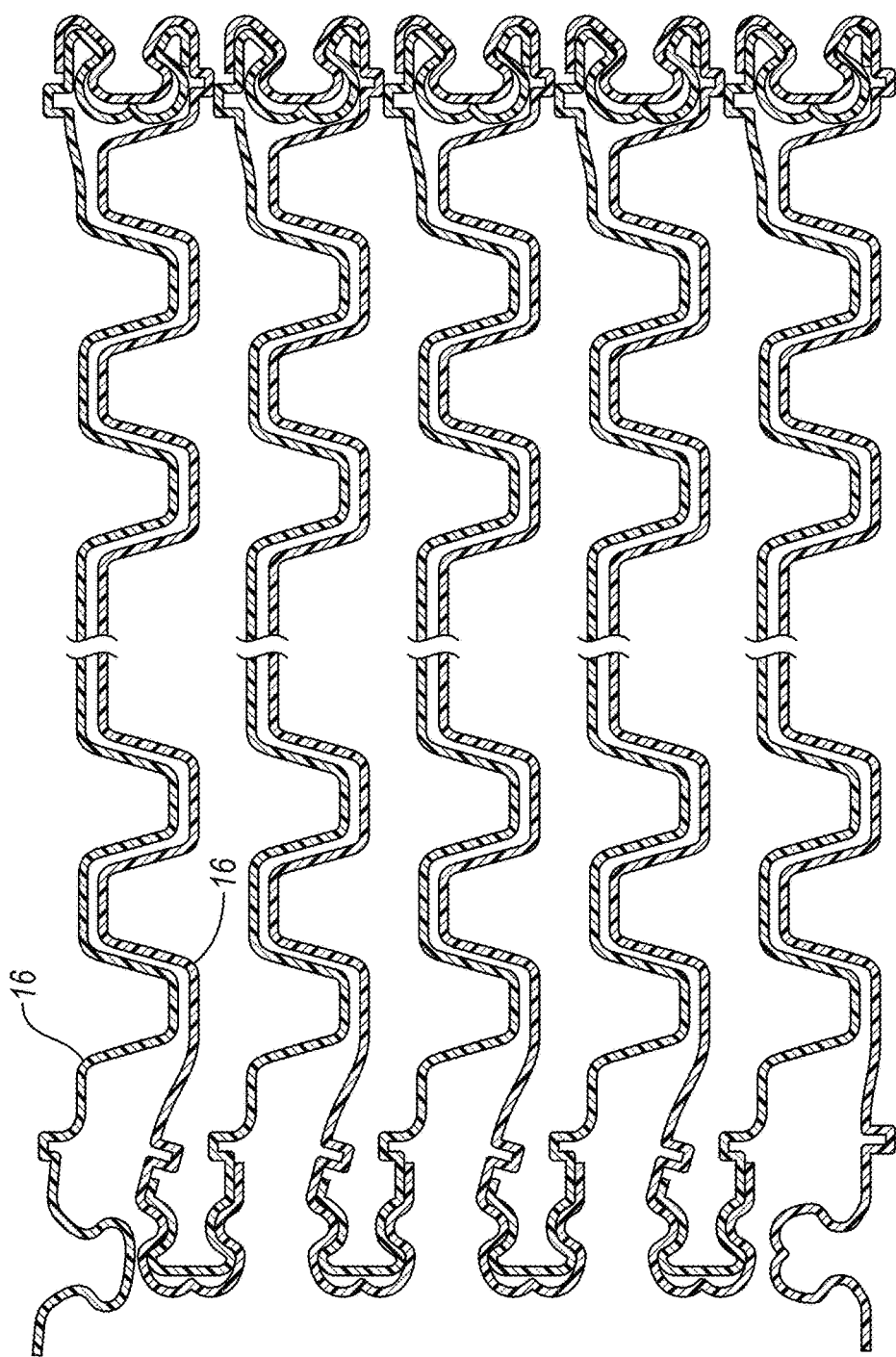
FIG. 14 is an end view of nested arrays of subassemblies that are folded at a production facility before shipment to an installation site.

FIG. 14 is a cross section through a ten module subassembly before deployment. Individual modules are joined to form a subassembly. Multiple subassemblies are folded like an accordion prior to shipping to the installation site. Male protuberances of adjacent subassemblies nest within one another. Similarly for the female members. This nested arrangement cuts the packaging density in half relative to a comparable foam or solid material of the same thickness. The increase packaging density reduces the shipping costs and allows the product to be shipped globally with acceptable economics. Studies show that for instance an 80,000 square foot football field can fit into one standard size truck or ocean container.

Returning to FIG. 3, there is depicted a cross section through an underlayment module with the receiving surface 12 attached. In the embodiment depicted, the cones are oriented with their narrow end wall toward the reaction surface 14. The receiving surface 12 can be any number of cover materials, including for example synthetic turf, vinyl flooring, wood, laminate, marine boat decking, etc. Optionally, such cover materials can be adhered to the underlayment module using an adhesive or mechanical attachment. The receiving surface or cover material covers the majority of the base including the male protuberances and central array but leaves the female protuberances exposed to receive the male protuberances of the adjacent panel. By engaging snaps on adjacent modules 16, a semi-continuous surface is created. This leaves an abutment or crack between adjacent modules 16 or subassemblies.

Figure 15:
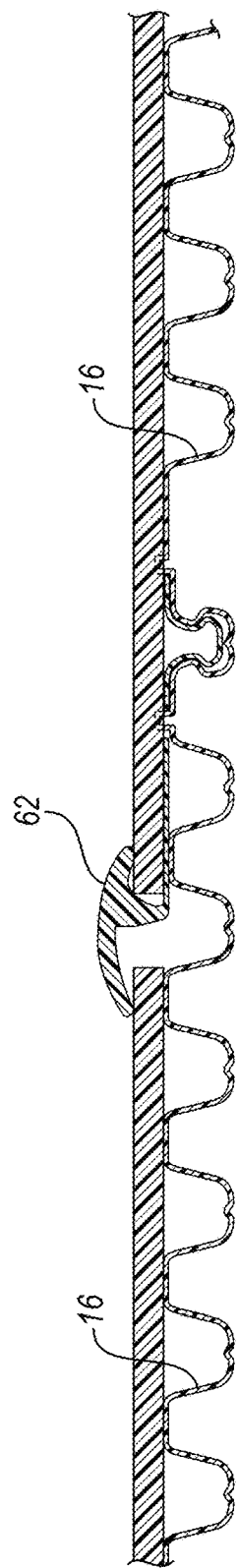
FIG. 15 is an end view illustrating abutment between two adjacent modules and a transition extrusion member deployed across a seam therebetween.

While abutted seams may be acceptable for some applications, a transition material such as a profile extrusion or caulk can be used to mask the seam once assembled. FIG. 15 is an end view illustrating abutment between two adjacent modules and a transition extrusion member 62 deployed across a seam therebetween. The transition extrusion member 62 can be permanently or temporarily attached to each module, so that when the modules are snapped together, the seam is hidden beneath the molding.

One way to make and install the disclosed system is to practice these steps, not necessarily in the sequence described:
A. At the installation site:
  a. Prepare the lower foundation, considering its planarity, whether or not compacted, its granularity and uniformity of material distribution;
  b. Add a geotextile to constrain particulates and sand and to deaden sound;
B. At the production facility:
  a. Manufacture the individual modules and unite them to form subassemblies;
  b. Fold to form nested arrays of joined modules or subassemblies or roll the subassemblies to create interim surface underlayment systems in preparation for shipment to the installation site;
C. At the installation site:
  a. Unroll or unfold the subassemblies and place atop the geotextile;
  b. Overlap adjacent edges of subassemblies so that male or female edge features cooperate and engage in a snap-fitting relationship to form an assembly or group of subassemblies;
  c. Overlay the assembly or group of subassemblies atop the lower foundation;
  d. Optionally add a layer of geotextile atop the assembly or group of subassemblies;
  e. Place and install the impact receiving surface atop the assembly or group of subassemblies or geotextile.

To recap, the disclosed surface underlayment system and energy absorbing composite, its manufacture, distribution and installation convey a number of attributes and advantages, including: (1) subassemblies of modules minimize the on-site time and labor for system installation; (2) subassemblies ship with a high packaging density that reduces transportation and packaging costs; (3) particulate-filled golf systems have a performance similar to natural grass, are less expensive and easier to install compared to the prior art; (4) modular underlayment systems with attached covering can be rapidly installed and uninstalled; (5) modular underlayment systems with attached covering nest to minimize storage space prior to installation and related transportation costs; (6) thermoforming offers easy performance tuning by changing the base sheet thickness and/or material type that is thermoformed over the tool; (7) the material of construction is durable, resilient, hydrolytically stable and chemically resistant; (8) the energy absorbing composite has superior drainage capabilities compared to other products; (9) interlocked modules and subassemblies are easy to install and accommodate thermal expansion and contraction; (10) the system can be easily and economically be transported to the job site due to the high packaging density (nesting) of the modules 10; (11) the system is light in weight and low in cost to manufacture; (12); the energy absorbing composite is compatible with existing foundations and little to no maintenance.

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A surface underlayment system that is interposed between a lower foundation and an upper impact-receiving surface, the surface underlayment system comprising:
  an assembly of energy absorbing interlocking modules, the assembly being operable to conform with a planar or undulating lower foundation without buckling, one or more of the energy absorbing modules being operable to be nested or stacked before transportation to a job site and cooperating to absorb at least some impact forces exerted upon the upper impact-receiving surface without the modules separating from each other, the modules also being operable to space apart the upper impact-receiving surface and the lower foundation;
  at least some of the energy absorbing modules including a thermoplastic and comprising one or more frustoconical support structures with bottom surfaces oriented towards the lower foundation that are circular, oval, or elliptical, at least some of the frustoconical support structures having an upper top surface, and a frustoconical sidewall connecting a bottom surface and an upper top surface;
  the upper top surface underlying the upper impact-receiving surface and the bottom surface being juxtaposed with the lower foundation, the upper top surface and bottom surface being operable to coordinate the response of the frustoconical support structures to impact; and
  at least some of the energy absorbing modules having edge flanges that define at least one oval female recess that is aligned with a direction of thermal expansion and contraction and at least one male protuberance that are adapted to respectively engage a male protuberance and a female recess of an adjacent module, wherein the at least one female recess and the at least one male protuberance slidingly engage to accommodate relative movement between adjacent modules so that relative movement therebetween can be accommodated without the buckling of adjacent modules.

2. The surface underlayment system of claim 1 wherein the upper top surface is substantially parallel with the bottom surface of at least one of the frustoconical support structures.

3. The surface underlayment system of claim 1, further including a filler material positioned between adjacent frustoconical support structures and a geotextile that is positioned below one or more of the energy absorbing modules.

4. The surface underlayment system of claim 1, further including a geotextile that is positioned across the bottom surfaces and the lower foundation.

5. The surface underlayment system of claim 1, further including grooves that are provided in the male protuberances and female recesses to offer a snap-fit engagement mechanism between adjacent modules so that the energy absorbing modules do not separate in response to external forces.

6. The surface underlayment system of claim 1, wherein the assembly includes a number (n) of modules, where $1<n<1,000,000$ and the modules that are joined by one or more straps or are snap-fitted together by snapping members or are joined by both straps and snapping members.

7. The surface underlayment system of claim 1, wherein the upper impact-receiving surface is selected from the group consisting of a surface on which golf is played, a hockey rink, a basketball court, a football field, a baseball field, a running track, a gym floor, floor tile, marine decking, senior living flooring, a home or assisted living facility where individuals are at increased risk of injury caused by falls due to certain medical conditions, one or more layers of permeable materials, synthetic turf, natural grass, the upper impact-receiving surface being placed atop of sedum, a geotextile, or a green product.

8. The surface underlayment system of claim 1, further comprising anti-friction lugs extending from the bottom surface that engage the lower foundation to reduce slippage therebetween.

9. The surface underlayment system of claim 1, in which one or more sidewalls have an impact response characteristic that is selected from the group consisting of buckling in response to impact and springing back to or towards an undeflected configuration after the impact and being undeflected in response to the impact.

10. The surface underlayment system of claim 1, further including an adhesive that lies between the surface underlayment system and the impact-receiving surface.

11. The surface underlayment system of claim 1, further including:
the lower foundation and
the upper impact-receiving surface,
the surface underlayment system, the lower foundation and the upper impact-receiving surface thereby forming an energy absorbing grouping.

12. The surface underlayment system of claim 1, wherein the bottom surfaces of at least some of the frustoconical support structures are configured like a rook with crenellations having upper edges that are adapted to lie adjacent to the lower foundation.

13. The surface underlayment system of claim 1, wherein the bottom surfaces of at least some of the frustoconical support structures are provided with undulations.

14. The surface underlayment system of claim 1, wherein the bottom surfaces or the upper top surfaces or both the upper top and bottom surfaces of at least some of the frustoconical support structures are provided with apertures for drainage.

15. The surface underlayment system of claim 1, further including an intermediate layer selected from the group consisting of a geo textile, a thin foam, a felt and combinations thereof positioned above or below or both above and below the modules.

16. The surface underlayment system of claim 1, further comprising anti-friction lugs extending from the upper top surface that engage the upper impact-receiving surface to reduce slippage therebetween.

* * * * *